United States Patent
Bhan

(10) Patent No.: US 6,919,018 B2
(45) Date of Patent: Jul. 19, 2005

(54) ARSENIC REMOVAL CATALYST AND METHOD FOR MAKING SAME

(75) Inventor: Opinder Kishan Bhan, Katy, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/829,642

(22) Filed: Apr. 22, 2004

(65) Prior Publication Data

US 2004/0198593 A1 Oct. 7, 2004

Related U.S. Application Data

(62) Division of application No. 10/022,593, filed on Dec. 17, 2001, now Pat. No. 6,759,364.

(51) Int. Cl.$^7$ ............................................... C10G 45/04
(52) U.S. Cl. ................ 208/251 R; 208/253; 208/251 H
(58) Field of Search .................... 208/251 R, 251 H, 208/253

(56) References Cited

U.S. PATENT DOCUMENTS

| | | | | | |
|---|---|---|---|---|---|
| 3,617,528 | A | * | 11/1971 | Hilfman | 208/216 R |
| 4,719,006 | A | * | 1/1988 | Goyal | 208/251 R |
| 4,738,944 | A | * | 4/1988 | Robinson et al. | 502/211 |
| 4,846,961 | A | * | 7/1989 | Robinson et al. | 208/216 PP |
| 5,389,595 | A | * | 2/1995 | Simpson et al. | 502/315 |
| 5,686,375 | A | * | 11/1997 | Iyer et al. | 502/315 |

* cited by examiner

Primary Examiner—Walter D. Griffin
(74) Attorney, Agent, or Firm—Charles W. Stewart

(57) ABSTRACT

A catalyst for removing arsenic from petroleum feedstocks comprising a porous refractory support impregnated with at least 8 wt. % of a Group VIB metal and an amount of Group VIII metal such that the atomic ratio of Group VIII metal to Group VIB metal is between about 1.5 and 2.5. A method of making such catalyst and a process for removing arsenic metals from a petroleum fraction using said catalyst.

14 Claims, No Drawings

ARSENIC REMOVAL CATALYST AND METHOD FOR MAKING SAME

This application is a division of Ser. No. 10/022,593, filed Dec. 17, 2001, now U.S. Pat. No. 6,759,364.

FIELD OF THE INVENTION

This invention relates to a catalyst for removal of arsenic from hydrocarbon oils and fractions and a method of making such catalyst.

BACKGROUND OF THE INVENTION

Arsenic is naturally present in petroleum feedstocks. Although the concentration of arsenic is low in most petroleum feeds, some crude oils, especially those found on the West Coast of the United States, contain high levels of arsenic. Some shale oils are also known to have high levels of arsenic. In these and other feedstocks, arsenic is usually found in the form of organo-metallic complexes and is present in light petroleum fractions such as naphtha and distillates. This arsenic is deposited on hydrotreating catalysts during operations designed to remove sulfur and nitrogen compounds.

The deposition of only 0.1 wt. % arsenic on a hydrotreating catalyst can cause significant catalyst deactivation. In some services, as little as 0.5 wt. % arsenic deposited on a catalyst can cause the loss of more than 70% of such catalyst' activity. Refiners cope with this problem by regularly replacing conventional hydrotreating catalysts that have been poisoned by arsenic. Heretofore, catalysts having specific activity and selectivity for arsenic removal have not been developed. The present invention provides for a catalyst that is effective at selectively removing arsenic from petroleum feedstocks, particularly from naphtha and light distillates, while simultaneously catalyzing the removal of sulfur and nitrogen.

Some researchers have taught hydrotreating catalysts that bear a superficial similarity to the catalyst of the present invention. For example, in U.S. Pat. No. 4,048,155, O'Hara teaches a desulfurization catalyst comprising an inorganic oxide carrier, a Group VIB metal component and a Group VIII metal component that is prepared by extruding at least 10% of the Group VIII metal component with the inorganic oxide carrier material and then finished by impregnating the resulting extrudate with the Group VIB metal and remaining Group VIII metal components.

More recently, U.S. Pat. Nos. 5,389,595 and 5,494,568 (Simpson, et al.) and U.S. Pat. No. 5,686,375 (Iyer, et al.) have taught a hydrotreating catalyst, hydrotreating process and method of making said catalyst wherein the catalyst comprises a porous refractory support containing an underbedded Group VIII metal-containing compound also impregnated with a Group VIB metal.

SUMMARY OF THE INVENTION

It has been found that a catalyst comprising a porous support and high concentrations of a Group VIII metal selected from nickel and cobalt and a Group VIB metal selected from molybdenum and tungsten is particularly effective at removing arsenic from petroleum feedstocks. The present invention provides for such a catalyst comprising a porous support, at least 10 wt. % molybdenum or tungsten calculated as the metal and between 1.5 moles and 2.5 moles of nickel or cobalt for each mole of the Group VIB metal. This catalyst has been found to be particularly effective at removing arsenic from naphtha and light distillate cuts while exhibiting hydrodesulfurization and hydrodemetallization similar to conventional catalysts. The catalyst of the present invention exhibits good stability, i.e., the ability to exhibit activity equivalent to or close to its initial activity, even when the amount of arsenic removed (i.e., deposited on the catalyst) is as high as 3 to 4 wt. % of the catalyst when fresh.

The present invention also provides for a process for manufacturing such catalyst comprising:

a) impregnating a porous support with sufficient solution of a nickel or cobalt compound such that the impregnated support comprises at least 8 wt. % Group VIII metal calculated as the metal;

b) drying the Ni- or Co-impregnated support of step (a) at low temperature and then calcining at a temperature of at least 427° C.;

c) impregnating the product of step (b) with a solution of a Group VIB compound selected from molybdenum and tungsten compounds and, optionally, phosphorus and/or an additional amount of the Group VIII compound deposited in step (a), followed by drying; and d) calcining the product of step (c) at a temperature at least 30° C. lower than that at which the calcining in step (b) is done.

Finally, the present invention provides for a catalyst made by the process of the present invention and for a process for removing arsenic from a petroleum fraction comprising contacting such petroleum fraction with the catalyst of the present invention in the presence of hydrogen at elevated temperature and pressure.

DETAILED DESCRIPTION

Catalyst

The catalyst of the present invention comprises a porous refractory support impregnated with a Group VIB metal selected from molybdenum and tungsten and a Group VIII metal selected from nickel and cobalt, wherein the atomic ratio of Group VIII metal to Group VIB metal is at least 1.5 and the amount of Group VIB metal on the finished catalyst is at least 8 wt. %.

Support

A porous support is typically used to carry the catalytically reactive metal(s). Supports are typically alumina, alumina-silica, silica, titania, zirconia, boria, magnesia, zeolites and combinations thereof. Porous carbon-based materials such as activated carbon and/or porous graphite can be utilized as well. The preferred supports in this invention are alumina-based and alumina-silica-based carriers.

The pore size distribution of the support is relatively immaterial to arsenic removal activity. Therefore, the pore size distribution of the support should be optimized to maximize sulfur and nitrogen removal. Arsenic removal depends primarily upon the amount of Group VIII metal present in the catalyst and proximity of such to the Group VIB metal, when present in a dispersed state on the catalyst surface.

Catalytic Metal

The key element of the present invention is the impregnation of the support with high concentrations of a Group VIII metal selected from nickel and cobalt and relatively high concentrations of a Group VIB metal elected from molybdenum and tungsten. For arsenic removal from naphtha and light distillate cuts, nickel and molybdenum are preferred.

To demonstrate superior effectiveness in the removal of arsenic, the finished catalyst of the present invention should contain at least about 8 wt. % of the Group VIB metal. The amount of Group VIII metal deposited on the catalyst should be sufficient to result in an atomic ratio of the Group VIII metal to the Group VIB metal between 1.5/1 and 2.5/1, preferably 2/1.

Phosphorus aids hydrogenation. Its presence in the finished catalyst is also optional. If present, the amount of phosphorus should be between about 0.1 wt. % and about 3 wt. % of the finished catalyst.

Catalyst Preparation

The catalyst of the present invention may be prepared by first making a porous refractory support by any of the methods well known to those skilled in the art. In the preferred method, alumina powder is mixed with water and either acetic or nitric acid, and optionally with about 1 wt. % Group VIII metal as nickel or cobalt nitrate. The mixture is mulled and extruded into the desired shape. The support is finished by drying at approximately 100° C. for several hours followed by calcining for 2 hours at a temperature of between 450° C. and 700° C.

The support is then impregnated with a sufficient amount of a solution of a Group VIII metal to result in the impregnated support containing at least 10 wt. % of the metal. The preferred metal is nickel and the preferred solutions are nickel nitrate in water and nickel carbonate in ammonium hydroxide. After impregnation, the support is dried for several hours at low temperature, i.e., approximately 100° C., followed by calcination for at least two hours at a temperature of at least 427° C., preferably at 510° C.

The final step in preparing the catalyst is impregnation with a sufficient amount of solution containing a Group VIB metal compound and, optionally, an additional amount of the same Group VIII metal compound previously deposited so that the finished catalyst contains at least 8 wt. % of the Group VIB metal, and preferably approximately 13 wt. %. The impregnation solution may optionally be a phosphoric acid solution containing sufficient phosphorus to result in approximately 2 wt. % phosphorus on the finished catalyst. Following impregnation, the catalyst is dried for several hours at approximately 100° C. and calcined at a temperature at least 30° C. lower than the first calcination temperature for approximately two hours.

Process for Removing Arsenic from Hydrocarbon Fractions

Removal of arsenic from hydrocarbon fractions may be achieved by contacting such feed with the catalyst of the present invention in the presence of hydrogen at elevated temperature and pressure. The preferred operating conditions are between about 2,860 kPa and about 18,720 kPa, between about 260° C. and about 490° C., a hydrogen treat gas rate between about 180 m$^3$/m$^3$ of feed and 1,600 m$^3$/m$^3$ of feed and sufficient catalyst to result in a liquid hourly space velocity (LHSV) of between about 0.1 hr$^{-1}$ and about 40 hr$^{-1}$. It is preferred that the catalyst of the present invention be employed in the lead or first bed of a multi-bed system to permit removal of arsenic by a catalyst that is particularly well-adapted for such, thereby permitting the use of another catalyst less resistant to rapid deactivation from arsenic contamination in subsequent beds.

EXAMPLES

Example 1

This example describes the preparation of a catalyst of the present invention and the characteristics of such catalyst.

A support was prepared by mulling 3,984 g of wide pore alumina (as is weight) an aqueous nickel nitrate solution comprising 153 g of nickel nitrate in 3,225 g of deionized water for 40 minutes. The mulled mixture was extruded through a 1.3 TL die plate, dried at 125° C. and then calcined at 482° C. The resulting support, designated "Base Support A", comprised alumina and 1 wt. % nickel.

691 g of Base Support A were impregnated with 353 g of Ni(NO$_3$)$_2$.6H$_2$O dissolved in 574 ml of deionized water, aged for 2 hours with occasional agitation, dried at 100° C. for 3 hours and then calcined at 482° C. for 2 hours. The resulting impregnated support was designated "Catalyst Support A".

Two solutions were prepared:

Solution #1 was made by combining 180.6 g of (NH$_4$)$_2$Mo$_2$O$_7$, 49.5 g of MoO$_3$, 35.4 g of 30% H$_2$O$_2$, 8.7 g of monoethanolamine (MEA) and 147.1 g of deionized water, heating the mixture to 65° C. to dissolve and then cooling to room temperature.

Solution #2 was made by combining 75.9 g of Ni(NO$_3$)$_2$.6H$_2$O and 30.1 g of NiCO$_3$ with 100 g of deionized water and then adding 72.4 g of an 85% solution of H$_3$PO$_4$.

Solutions #1 and #2 were combined and sufficient deionized water added to bring the combined solution volume up to 540 ml. 750 g of Catalyst Support A were impregnated with the combined solution, aged for 2 hours with occasional agitation, dried at 100° C. overnight and then calcined at 452° C. for 2 hours. The resulting catalyst was designated "Catalyst A". Analysis of Catalyst A showed that its composition was 9.4 wt. % Ni, 12.2 wt. % Mo, 1.9 wt. % P and the balance alumina.

Example 2

This example describes the preparation of another catalyst of the present invention and the characteristics of such catalyst.

A support was prepared by mulling 3,200 g of γ-alumina with 2,964.5 g of deionized water for 45 minutes, followed by drying at 149° C. and calcining at 815° C. The resulting support, designated "Base Support C", comprised alumina.

1300 g of Base Support C were impregnated with 727.8 g of Ni(NO$_3$)$_2$.6H$_2$O dissolved in 377 g of deionized water, aged for 2 hours with occasional agitation, dried at 100° C. for 3 hours and then calcined at 482° C. for 2 hours. The resulting impregnated support was designated "Catalyst Support C".

A solution was made by combining 102.5 g of (NH$_4$)$_2$Mo$_2$O$_7$, 28.1 g of MoO$_3$, 20.1 g of 30% H$_2$O$_2$, 4.9 g of monoethanolamine (MEA) and 83.4 g of deionized water, heating the mixture to 60° C. to dissolve and then cooling to room temperature.

Sufficient deionized water added to bring the combined solution volume up to 475 ml. 650 g of Catalyst Support C were impregnated with the combined solution, aged for 2 hours with occasional agitation, dried at 100° C. overnight and then calcined at 452° F. for 2 hours. The resulting catalyst was designated "Catalyst C". The composition of Catalyst C was 10.2 wt. % Ni, 10.2 wt. % Mo, and the balance alumina.

Example 3

This example describes the preparation of a third catalyst of the present invention and the characteristics of such catalyst.

A support was prepared as in Example 2 and was again designated "Base Support C".

1200 g of Base Support C were impregnated with 671.1 g of Ni(NO$_3$)$_2$.6H$_2$O dissolved in 1,100 ml of deionized water, aged for 2 hours with occasional agitation, dried at 100° C. for 3 hours and then calcined at 482° C. for 2 hours. The resulting impregnated support was designated "Catalyst Support D".

A solution was made by combining 140.4 g of $(NH_4)_2Mo_2O_7$, 35.4 g of $NiCO_3$, 223.1 g of 29.5% $NH_4OH$ and 100 g of deionized water, and then cooling to room temperature.

Sufficient deionized water added to bring the combined solution volume up to 475 ml. 650 g of Catalyst Support D were impregnated with the combined solution, aged for 2 hours with occasional agitation, dried at 100° C. overnight and then calcined at 452° C. for 2 hours. The resulting catalyst was designated "Catalyst D". The composition of Catalyst D was 10.5 wt. % Ni, 10.1 wt. % Mo, and the balance alumina.

Example 4

Comparative

This example compares the arsenic removal capacity of two catalysts of the present invention, Catalysts C and D, to that of a commercial Ni/Mo hydrotreating catalyst (Catalyst G) and a commercial Ni/Mo Resid Demetallization/Desulphurization catalyst (Catalyst H).

Catalyst G comprises an alumina 1.3 mm trilobe extrudate impregnated with 3.2 wt. % nickel, 3.0 wt. % phosphorus and 12.8 wt. % molybdenum. Catalyst H comprises an alumina 1.2 mm trilobe extrudate impregnated with 1.5 wt. % nickel, 8.0 wt. % molybdenum and 2.0 wt. % phosphorus.

Samples of Catalysts C, D, G and H were placed in cylindrical baskets and installed in the catalyst bed of a commercially operating naphtha hydrotreater. After 18 months of normal operation, the hydrotreater was shut down, the baskets removed and the catalyst samples analyzed to determine the amounts of arsenic removed by each sample. The results of those analyses are shown in Table 1.

TABLE 1

| Catalyst | Arsenic Deposited, wt. % on fresh catalyst |
|---|---|
| C | 2.9 |
| D | 3.2 |
| G | 1.7 |
| H | 0.7 |

These data show that catalysts of the present invention have a much higher capacity for removal of arsenic from a naphtha feedstock than commercially available catalysts containing the same, but lower amounts of, catalytic metal.

Example 5

Comparative

This example compares the catalytic activity for sulfur and nitrogen removal of two catalysts of the present invention, Catalysts A and D, to that of two commercial Ni/Mo hydrotreating catalysts (Catalysts G and I).

Catalyst I comprises an alumina 1.3 mm trilobe extrudate impregnated with 3.7 wt. % nickel, 12.9 wt. % molybdenum and 2.0 wt. % phosphorus.

Samples of each of the four catalysts were individually contacted for 36 hours with a feedstock comprising a mixture of catalytically cracked gas oil and extra heavy gas oil. The operating conditions were 343° C., 8,377 kPa, a treat gas rate of 356 $m^3/m^3$ of feed and a space velocity (LHSV) of 1.5 $hr^{-1}$. The concentrations of sulfur and nitrogen in the feed and product from the reactor were measured during each test run and the reaction rate constants for sulfur and nitrogen removal were calculated according to the following formula:

$$k = \frac{LHSV}{2}\left[\frac{1}{C_0} - \frac{1}{C_i}\right]$$

where k=the reaction rate constant $C_o$=the concentration of sulfur or nitrogen leaving the reactor, and $C_i$=the concentration of sulfur or nitrogen entering the reactor.

The reaction rate constants for sulfur and nitrogen removal for Catalyst G were defined as 100 and the Relative Volumetric Activity (RVA) for each of the other catalysts were determined by the ratio of its reaction rate constant to that of Catalyst G. The results are presented in Table 2.

TABLE 2

| Catalyst | RVA-Sulfur | RVA-Nitrogen |
|---|---|---|
| G | 100 | 100 |
| I | 118 | 107 |
| A | 97 | 102 |
| D | 83 | 61 |

These data show that Catalyst A, a catalyst of the present invention containing phosphorus, is as effective at catalyzing the removal of sulfur and nitrogen as commercial catalysts designed for that purpose. Catalyst D, another catalyst of the present invention not containing phosphorus, while demonstrating superior capability for arsenic removal, is effective for sulfur and nitrogen removal.

Catalyst I is generally used for hydrotreating service. Catalyst A is a version of this catalyst that has been modified as taught in the present invention to make a catalyst with superior arsenic removal activity. Either Catalyst A or Catalyst D are suitable for replacement of the lead portion of Catalyst G or Catalyst I in a reactor system. This replacement will allow longer operation of the catalyst bed since most of the arsenic will be deposited in the lead portion (i.e., the Catalyst A or D portion) where it will not be as detrimental to reactor performance as it would be if it were deposited on the Catalyst G or Catalyst I portion. For those operations wherein the arsenic level in the feedstock is high, either Catalyst A or Catalyst D can be used for most or all of the entire reactor catalyst charge.

Example 6

Comparative

This example compares the catalytic activity for sulfur and nitrogen removal of samples of Catalyst D and Catalyst G from Example 4 after regeneration.

Samples of Catalyst D and Catalyst G used in Example 4 were regenerated in the laboratory using the following procedure:

a) the samples were stripped of oils and any volatile organic compounds by heating in a nitrogen atmosphere, starting at 107° C. and increasing the temperature at 14° C./minute. Upon reaching a temperature of 370° C., the temperature was maintained for two hours;

b) sample stripping was followed by calcination of carbon residues in air. The initial calcination temperature was 107° C., increasing at 14° C./minute. Upon reaching a temperature of 370° C., the temperature was maintained for two hours to complete the regeneration.

The regenerated samples were then tested for hydrotreating activity according to the test procedure described in Example 5. The results of the testing are shown in Table 3.

TABLE 3

| Catalyst | RVA-Sulfur | RVA-Nitrogen |
|----------|------------|--------------|
| G        | 39         | 57           |
| D        | 49         | 46           |

These data show that the catalyst of the present invention retains a higher activity for sulfur removal, even when it has absorbed nearly twice the amount of arsenic as the commercial catalyst.

I claim:

1. A process comprising:
    contacting under arsenic removal process conditions a hydrocarbon feed, containing arsenic, with a catalyst comprising:
        alumina; at least 8 weight percent nickel; at least 8 weight percent molybdenum;
        and between about 0.1 weight percent to about 3 weight percent phosphorous;
    wherein said catalyst is prepared by
    forming a support, said support comprises alumina and nickel,
    wherein said nickel is present in said support in an amount of no more than 1 weight percent, and
    wherein said support is formed by mixing alumina, water, a nickel compound, and an acid selected from the group consisting of nitric acid and acetic acid, to thereby form a mixture thereof, extruding said mixture, and calcining, at a first calcining temperature, said mixture to thereby form said support;
    impregnating said support with a first solution of a nickel compound to thereby form an impregnated support; and
    calcining, at a second calcining temperature, said impregnated support to thereby provide a calcined impregnated support;
    incorporating molybdenum and phosphorous into said calcined impregnated support to thereby provide a molybdenum/phosphorous incorporated material; and
    thereafter, calcining, at a third calcining temperature, said molybdenum/phosphorous incorporated material to thereby provide said catalyst.

2. A process as recited in claim 1, wherein the amount of nickel in said catalyst is at least 10 weight percent.

3. A process as recited in claim 2, wherein the amount of molybdenum in said catalyst is in the range of from 8 weight percent to 14 weight percent.

4. A process as recited in claim 3, wherein said first calcining temperature is in the range of from 450° C. to 700° C., wherein said second calcining temperature is in the range of at least 427° C., and said third calcining temperature is in the range of from 450° C. to 700° C.

5. A process as recited in claim 4, wherein said incorporating step includes impregnating said calcined impregnated support with a second solution containing a molybdenum compound and phosphoric acid to thereby provide said molybdenum/phosphorous incorporated material so as to provide said catalyst.

6. A process as recited in claim 5, wherein said nickel compound is nickel nitrate.

7. A process as recited in claim 6, wherein said arsenic removal process conditions include a pressure between about 2860 kPa and about 18,720 kPa, a temperature between about 260° C. and about 490° C., a hydrogen treat gas rate between 180 $m^3/m^3$ and 1600 $m^3/m^3$, and a liquid hourly space velocity between about 0.1 $hr^{-1}$ and about 40 $hr^{-1}$.

8. A process comprising:
    contacting under arsenic removal process conditions a hydrocarbon feed, containing arsenic, with a catalyst, consisting essentially of: alumina; at least 8 weight percent nickel; at least 8 weight percent molybdenum; and between about 0.1 weight percent to about 3 weight percent phosphorous; wherein said catalyst is prepared by
    forming a support, said support comprises alumina and nickel,
    wherein said nickel is present in said support in an amount of no more than 1 weight percent, and
    wherein said support is formed by mixing alumina, water, a nickel compound, and an acid selected from the group consisting of nitric acid and acetic acid, to thereby form a mixture thereof, extruding said mixture, and calcining, at a first calcining temperature, said mixture to thereby form said support;
    impregnating said support with a first solution of a nickel compound to thereby form an impregnated support; and
    calcining, at a second calcining temperature, said impregnated support to thereby provide a calcined impregnated support;
    incorporating molybdenum and phosphorous into said calcined impregnated support to thereby provide a molybdenum/phosphorous incorporated material; and
    thereafter, calcining, at a third calcining temperature, said molybdenum/phosphorous incorporated material to thereby provide said catalyst.

9. A process as recited in claim 8, wherein the amount of nickel in said catalyst is at least 10 weight percent.

10. A process as recited in claim 9, wherein the amount of molybdenum in said catalyst is in the range of from 8 weight percent to 14 weight percent.

11. A process as recited in claim 10, wherein said first calcining temperature is in the range of from 450° C. to 700° C., wherein said second calcining temperature is in the range of at least 427° C., and said third calcining temperature is in the range of from 450° C. to 700° C.

12. A process as recited in claim 11, wherein said incorporating step includes impregnating said calcined impregnated support with a second solution containing a molybdenum compound and phosphoric acid to thereby provide said molybdenum/phosphorous incorporated material so as to provide said catalyst.

13. A process as recited in claim 12, wherein said nickel compound is nickel nitrate.

14. A process as recited in claim 13, wherein
    a process as recited in claim 6, wherein said arsenic removal process conditions include a pressure between about 2860 kPa and about 18,720 kPa, a temperature between about 260° C. and about 490° C., a hydrogen treat gas rate between 180 $m^3/m^3$ and 1600 $m^3/m^3$, and a liquid hourly space velocity between about 0.1 $hr^{-1}$ and about 40 $hr^{-1}$.

* * * * *